United States Patent
Bishop et al.

(10) Patent No.: US 7,104,380 B2
(45) Date of Patent: Sep. 12, 2006

(54) DUAL AREA PISTON FOR TRANSMISSION CLUTCH AND SEQUENTIAL CONTROL THEREFOR

(75) Inventors: Brian Bishop, Ira Township, MI (US); Pete Bezjak, Dearborn, MI (US); Karl Jungbluth, Orchard Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 10/942,071

(22) Filed: Sep. 15, 2004

(65) Prior Publication Data

US 2006/0054444 A1   Mar. 16, 2006

(51) Int. Cl.
*F16D 25/638* (2006.01)
*F16D 25/12* (2006.01)

(52) U.S. Cl. .............. 192/85 AA; 192/85 R; 192/109 F

(58) Field of Classification Search ............ None
See application file for complete search history.

(56) References Cited

U.S. PATENT DOCUMENTS

| | | | |
|---|---|---|---|
| 3,237,404 A * | 3/1966 | Flanigan et al. | 192/109 F |
| 3,470,988 A | 10/1969 | Sieverkropp | |
| 3,472,350 A | 10/1969 | Overson | |
| 3,576,241 A | 4/1971 | Maurice et al. | |
| 3,915,274 A | 10/1975 | Utter | |
| 4,147,245 A | 4/1979 | Folomin et al. | |
| 4,186,829 A | 2/1980 | Schneider et al. | |
| 4,713,984 A * | 12/1987 | Ohkubo | 192/109 F |
| 4,753,136 A * | 6/1988 | Hayakawa et al. | 475/146 |
| 4,875,561 A | 10/1989 | Schneider et al. | |
| 6,035,989 A | 3/2000 | Matsuoka | |
| 6,595,339 B1 | 7/2003 | Bauknecht et al. | |
| 6,920,971 B1 * | 7/2005 | Creger | 192/85 AA |

* cited by examiner

*Primary Examiner*—Rodney H. Bonck
(74) *Attorney, Agent, or Firm*—David B. Kelley; MacMillan, Sobanski & Todd, LLC

(57) ABSTRACT

A system for actuating a clutch that alternately driveably connects and disconnects components, includes a clutch having a piston that includes a first apply area and a second apply area, a fluid pressure source, a source of variable control pressure, and a control coupled with the fluid pressure source and operative in response to the control pressure to engage the clutch initially by increasing pressure steadily at the first apply area up to a first magnitude followed by a rapid increase in pressure at the first apply area and the second apply area above the first magnitude to a second magnitude.

17 Claims, 4 Drawing Sheets

DUAL AREA PISTON FOR TRANSMISSION CLUTCH AND SEQUENTIAL CONTROL THEREFOR

BACKGROUND OF THE INVENTION

This invention relates to a friction control element, such as a hydraulically or pneumatically actuated clutch, of the type used to control operation of an automatic transmission. In particular, the invention pertains to a control for producing staged engagement and disengagement of such a clutch having at least two sealed areas on its actuating piston.

Automatic transmissions are typically designed to transmit full engine torque and the engine torque as amplified by a torque converter at stall torque under static. i.e., non-shifting conditions. The control system of an automatic transmission includes a low/reverse clutch, which is applied or engaged to produce the lowest forward speed ratio and the reverse drive speed ratio. Such engagement produces a drive connection between components of the planetary gearing, which when selectively combined with the engagement of other control elements, results in the transmission operating in low gear or reverse gear. When the clutch is disengaged, another of the several forward speed ratios can be produced upon engagement of another combination of friction control elements. Therefore, gearshifts into and out of low gear, 1–2 upshifts and 2–1 downshifts, are produced at least in part by engaging and disengaging, respectively, the low/reverse clutch. Throughout this discussion, the term "friction control element" refers to a hydraulically actuated friction clutch or brake of a control system.

In order for the transmission to have the static torque capacity required to hold full stall torque, the low/reverse clutch is typically designed with a high gain to provide the required torque capacity to the low/reverse clutch. This high gain requirement, however, can affect good shift quality.

In a fully synchronous automatic transmission, all the gear ratio changes occur by coordinating the simultaneous disengagement and engagement of two friction control elements. In a fully synchronous automatic transmission, the low/reverse clutch controls 2–1 downshift events using a low gain clutch. In order to meet the shift quality requirements for all 2–1 events as well as to provide the static capacity required to hold stall torque, a low/reverse clutch must have at least two magnitudes of gain. A clutch having only a single gain will not suffice.

A clutch can produce multiple gains by providing multiple pressure areas on the hydraulic piston that actuates the clutch, primary and secondary pressurized areas. Production automatic transmissions have used this design technique in combination with control of the secondary pressure area on the actuating piston through operation of the transmission manual valve. This approach merely pressurizes both piston areas based on manual valve position with some degree of hydraulic control.

There is a need to provide direct control of the secondary area, preferably under control of an electronic control module and a pressure control device. This need is especially acute for a synchronous transmissions.

This invention provides direct control when the secondary area applies and is controlled via the electronic control module and a pressure control device. This allows the dual area clutch design to be used for shift events in synchronous transmissions.

SUMMARY OF THE INVENTION

The invention relates to a single low/reverse clutch piston with two distinct areas, which create distinct static and dynamic clutch gains. This invention provides direct control of the pressurized state of the secondary piston area, the application and control of pressure in the clutch via an electronic control module and a pressure control device. This allows the dual area clutch design to be used for shift events in synchronous transmissions.

The clutch and control system of this invention produce very fast response times, low dynamic gain for excellent shift quality and high static capacity for high torque applications.

A control according to this invention uses dual valve trains to control application of each element and allows tuning of the response of each portion of the piston. The sequential nature of the operation of the clutch also reduces any excessive load on the hydraulic system of the transmission, thereby eliminating any capacity drops, and the resulting clutch slip, during application of pressure to the static area of the clutch piston.

The clutch design is combined with a control system that uses the smaller dynamic piston area to stroke the clutch and conduct the shift event. After the dynamic event is complete, the control system seats or closes a check ball located behind the secondary piston area and then pressurizes the secondary piston area to provide the added capacity required for static events. The clutch and control system use a single pressure control device and a valve train for each portion of the dual area piston to control activation of the clutch. The dynamic low gain portion of the piston has an optimized small volume to react quickly, a check ball to prevent creating a vacuum in the secondary piston volume when stroking the piston using the secondary area and to provide a low overall gain for excellent gearshift quality. The dynamic low gain portion of the piston has an optimized small volume to react quickly and provide a low overall gain for excellent gearshift quality. The secondary area is controlled via the same pressure control device as the first area, but uses its own valve train to determine when to apply. Once in static capacity mode with both piston areas applied, the clutch gain is high for static capacity purposes. The release of the clutch is also coordinated. The larger, static piston area is dumped quickly, while the shift event takes place on the smaller low gain portion of the piston.

A system according to this invention for actuating a clutch that alternately driveably connects and disconnects components, includes a clutch having a piston that includes a first apply area and a second apply area, a fluid pressure source, a source of variable control pressure, and a control coupled with the fluid pressure source and operative in response to the control pressure to engage the clutch initially by increasing pressure steadily at the first apply area up to a first magnitude followed by a rapid increase in pressure at the first apply area and the second apply area above the first magnitude to a second magnitude.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
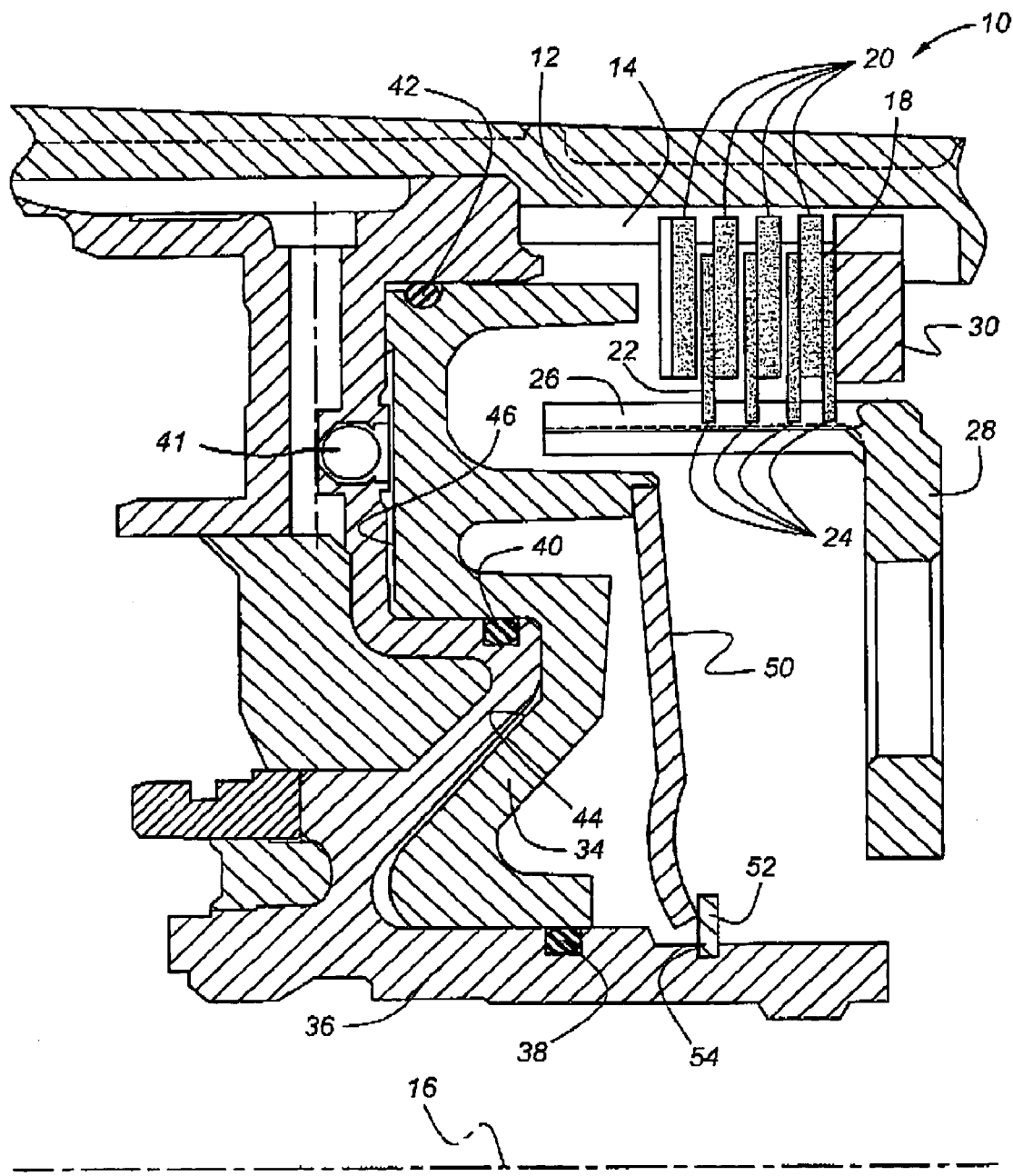
FIG. 1 is a cross section taken at a diametric plane through a hydraulically actuated friction clutch of an automatic transmission whose piston has a static area and a dynamic area.

Referring now to the drawings, there is illustrated in FIG. 1 a hydraulically actuated friction clutch 10, preferably the low/reverse clutch of an automatic transmission, which is located in a transmission housing. A connecting member 12, secured to and rotating with a component of a planetary gear set, having an inner surface on which spline teeth 14, directed parallel to an axis 16, are formed. The clutch is arranged substantially symmetrically about axis 16. Pressure plates 18, spaced mutually along the axis 16, have teeth 20 located at a radially outer periphery and engaging the spline teeth 14. Located between each pressure plate 18 is a clutch disc 22 having teeth 24 located at a radially inner periphery and engaging axially directed spline teeth 26 formed on a member connecting 28, which is secured to and rotates with another component of a planetary gearset. A backing plate 30, similarly splined to the internal splines 14, is secure to the housing against displacement. As is conventional, each discs 22 carries friction material, which contacts and frictionally engages the adjacent pressure plate when the clutch 10 is applied. In this way, the clutch alternately driveably connects and releases the components secured to connecting members 12 and 28.

A piston 34 is supported on a hydraulic cylinder 36 for axial displacement relative to the discs 22 and pressure plates 18. The piston is sealed on the cylinder preferably by O-rings 38, 40, 42 or another type of dynamic seal, against the passage of hydraulic fluid. The seals, divide the piston into two hydraulically separated zones. A primary, dynamic piston surface area 44 is located in one zone between seals 38 and 40; a secondary static piston surface area 46 is located in the other zone between seals 40 and 42. A check ball 41, located behind the piston area 46, opens to admit air into the cylinder space adjacent the secondary, static piston area 46 when piston 34 is displaced by pressure applied to the primary, dynamic piston area 44 area. This opening through the check valve 41 prevents a vacuum from forming in that portion of the cylinder as the piston moves in response to DI pressure. The check valve seats and closes when hydraulic pressure is applied to piston area 46. As an alternative to the check valve 41, any suitable device, such as a dynamic seal that responds to a pressure differential, can be used for this purpose.

A return spring 50, preferably a Belleville spring, is resiliently preloaded in contact with a snap ring 52, which is secured in a groove 54 on the cylinder 36, and with the piston 34. A force developed in the spring 50, as the piston moves rightward from the position of FIG. 1, opposes such displacement and tends to return the piston to the disengaged position of FIG. 1.

The piston is displaced rightward to engage the clutch when hydraulic pressure is applied to one or both of the spaces between the cylinder piston areas 44 and 46. Before fully engaging the clutch, the clutch is first stroked by applying regulated pressure to the primary area 44, thereby taking up clearances between clutch components principally spaces between the clutch discs and pressure plates. Preferably, the stroke displacement of the clutch is performed with close control so that it is completed without excess displacement or pressure. After the clutch is stroked, the clutch becomes fully engaged by applying pressure to the secondary piston area 46. The clutch must have torque capacity sufficient to produce and hold a force between the pressure plates 18 and discs 22 such that the clutch can transmit between the connecting members 12 and 14 the magnitude of torque required in the oncoming gear ratio.

Figure 2:
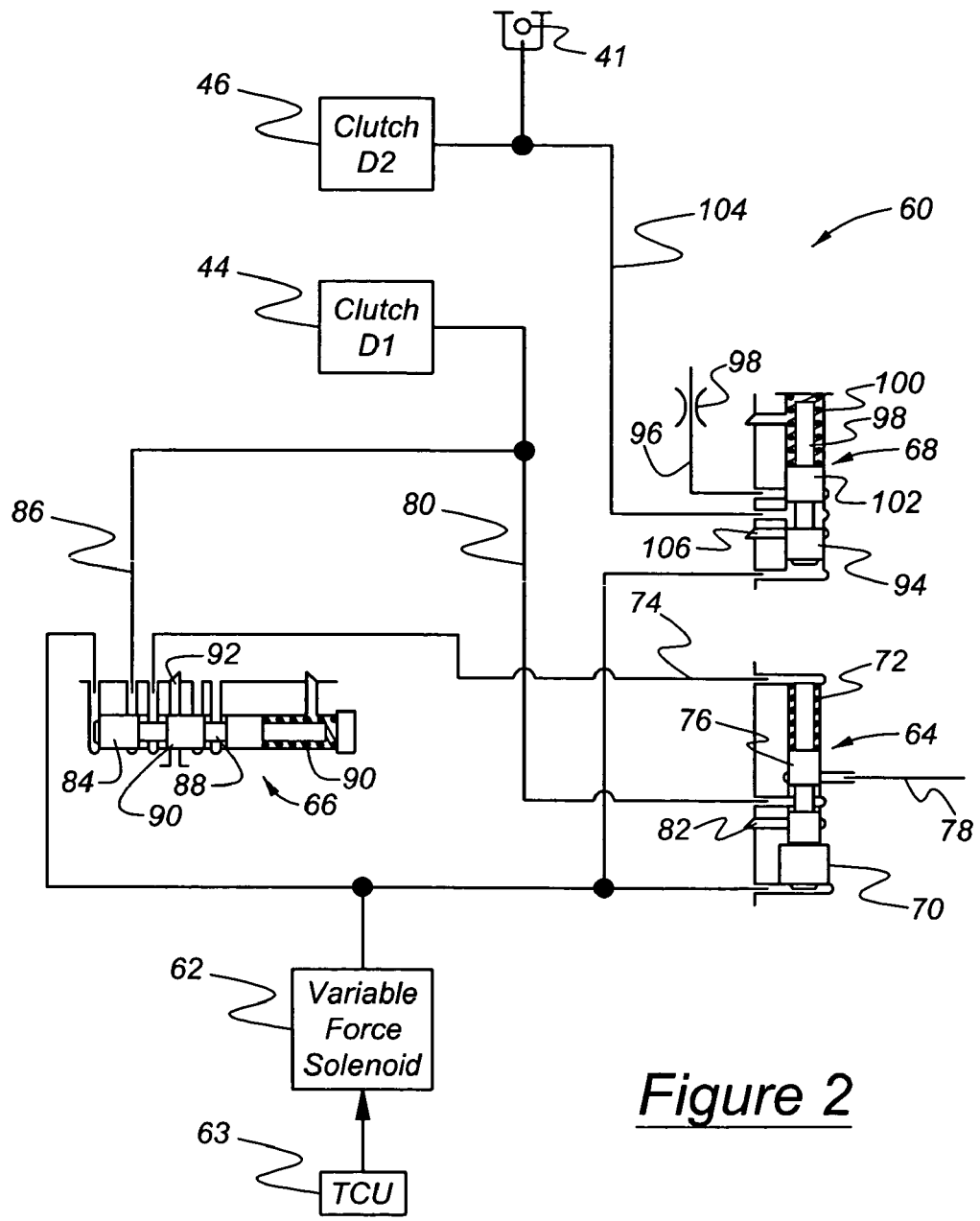
FIG. 2 is a schematic diagram of a system for controlling engagement and disengagement of the clutch by sequentially pressurizing the control areas of the clutch piston.
Figure 3:
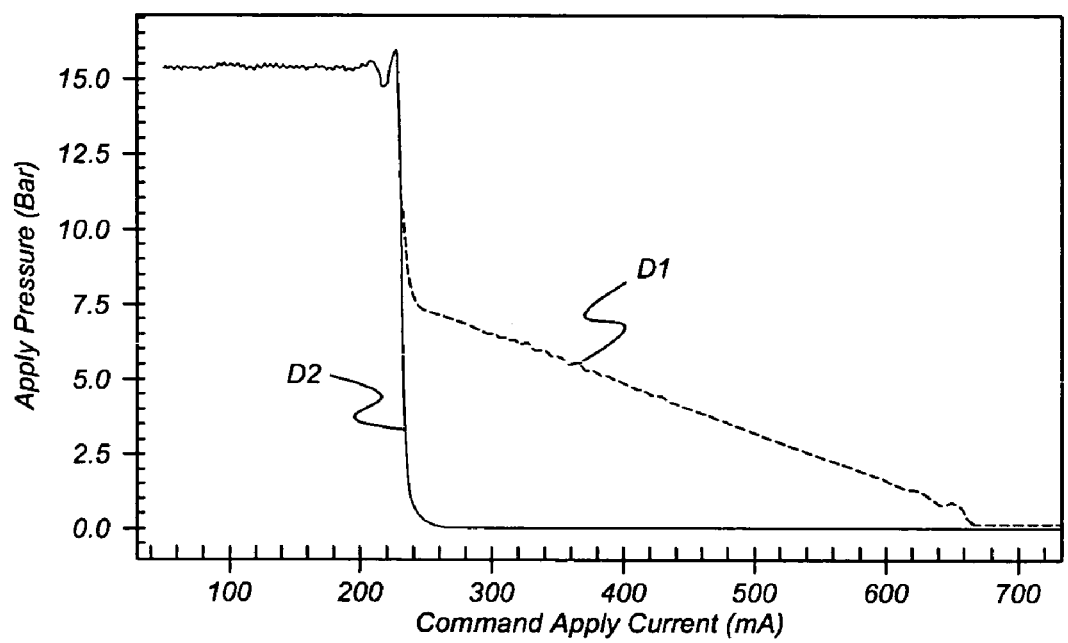
FIG. 3 is a graph showing the variation of D1 (primary area) clutch apply pressure and D2 (secondary area) clutch release pressure vs. the magnitude of commanded current applied to the variable force solenoid of FIG. 2 by a transmission control unit.

FIG. 2 illustrates a system 60 for controlling the staged application of hydraulic pressures and fluid flow, which first stroke and then fully engage clutch 10. The system 60 includes a valve controlled by a variable force solenoid (VFS) 62 that responds to a command signal produced by an electronic transmission control unit 63 (TCU), which controls operation of the transmission and its gear ratio changes. The VFS 62 controls a hydraulic valve, whose output pressure varies inversely with the magnitude of electric current supplied to the VFS 62. In the non-limiting example discussed here, the current control signal applied to VFS 62 varies in the range 850–50 mA. In response to the control current, the VFS-controlled valve produces pressure, which is applied to the end surface of a land on each of a D1 regulator valve 64, a D1 latch valve 66, and a D2 latch valve 68. FIG. 3 illustrates the variation of D1 clutch apply pressure and D2 clutch apply pressure produced by system 60 as the magnitude of the VFS current changes.

When VFS current is in the range of about 250–675 mA, the forces on the spool regulator valve 64 include the force of VFS pressure on land 70, the force of spring 72 on land 76, and the force of D1 feedback pressure on land 76. These forces regulate D1 pressure at clutch area 44 causing it to increase linearly and inversely with VFS current while VFS current is between about 250 mA and 675 mA, as illustrated in FIG. 3. Subject to these forces, regulator valve 64 alternately increases the magnitude of D1 pressure by opening a connection between line pressure feed 78 and line 80 and closing exhaust port 82 to line 80 when the spool of the valve moves upward, and decreases the magnitude of D1 pressure by closing a connection between line pressure feed 78 and line 80 and opening exhaust port 82 to line 80 when the spool of valve 64 moves downward.

D1 latch valve 66 has potential both to control D1 feedback pressure and to have no control over feedback pressure in line 74, depending on the magnitude of VFS current and VFS pressure. When VFS current is greater than about 250 nA and VFS pressure is relatively low, land 84 opens a connection between D1 feedback line 74 and line 86, which communicates with D1 area 44. When VFS current is equal to or less than about 250 mA, VFS pressure forces spool 88 of the D1 latch valve 66 rightward against the force of control spring 90, thereby closing line 86 and opening a connection between feedback line 74 and exhaust port 92. This eliminates feedback regulation of D1 regulating valve 64 and fully opens line pressure feed 78 to D1 area 44. FIG. 3 illustrates the step increase in D1 clutch apply pressure carried to area 44 through line 80 when VFS current reaches its latching pressure current.

The D2 latch valve 68 is continually connected to VFS pressure, which is applied to land 94. An orificed line pressure feed line 96 connects line pressure to D2 latch valve 68 through an orifice 98, which is sized to produce a desired flow rate of hydraulic fluid to D2 area 46. When pressure is applied to the D2 area 46, that pressure seats the check ball 41 located behind piston 34, thereby sealing the area 46 and allowing pressure to build in the D2 volume. That flow rate is preferably established such that the relatively large volume of fluid required to fill area 46 does not exceed the capacity of the transmission pump required to supply adequately other portions of the transmission hydraulic circuit.

When VFS current is about 250 mA, pressure on land 94 forces the spool 98 of D2 latch valve 68 upward against the force of spring 100, thereby allowing land 102 to open a connection between orificed line pressure feed line 96 and line 104, through which D2 clutch area 46 is filled with fluid and pressurized at a rate determined by the size of orifice 98. The VFS current and the corresponding VFS pressure at which D1 and D2 are latched may be substantially equal. The clutch torque capacity continues to increase until the commanded VFS current reaches about 70 mA and pressure at D1 area 44 and D2 area 46 are about 15.5 bar.

The clutch disengages in response to VFS pressure increasing to 250 mA, which delatches the latch valves 66, 68 allowing the D2 volume to drain through line 104 and exhaust port 106, and the check ball 41 then opens to atmospheric pressure. As VFS pressure declines, D1 latch valve 66 again controls feedback pressure in line 74, thereby linearly reducing D1 pressure until VFS current increases to about 850 mA.

In this way the clutch is engaged and disengaged in stages. First during an early, dynamic phase of clutch engagement, the clutch is quickly stroked with low gain control producing linearly increasing D1 pressure that is applied to the relatively small D1 area 44 and the corresponding clutch cylinder volume. After the dynamic phase, the area D1 44 is rapidly pressurized to line pressure. The full torque capacity of the clutch is developed upon filling and pressurizing the relatively large D2 area 46 and its corresponding clutch cylinder volume with fluid from a source of line pressure through orifice 98. Both D1 area 44 and D2 area 46 are pressurized at relatively high pressure, during the static phase of clutch engagement.

Figure 4:
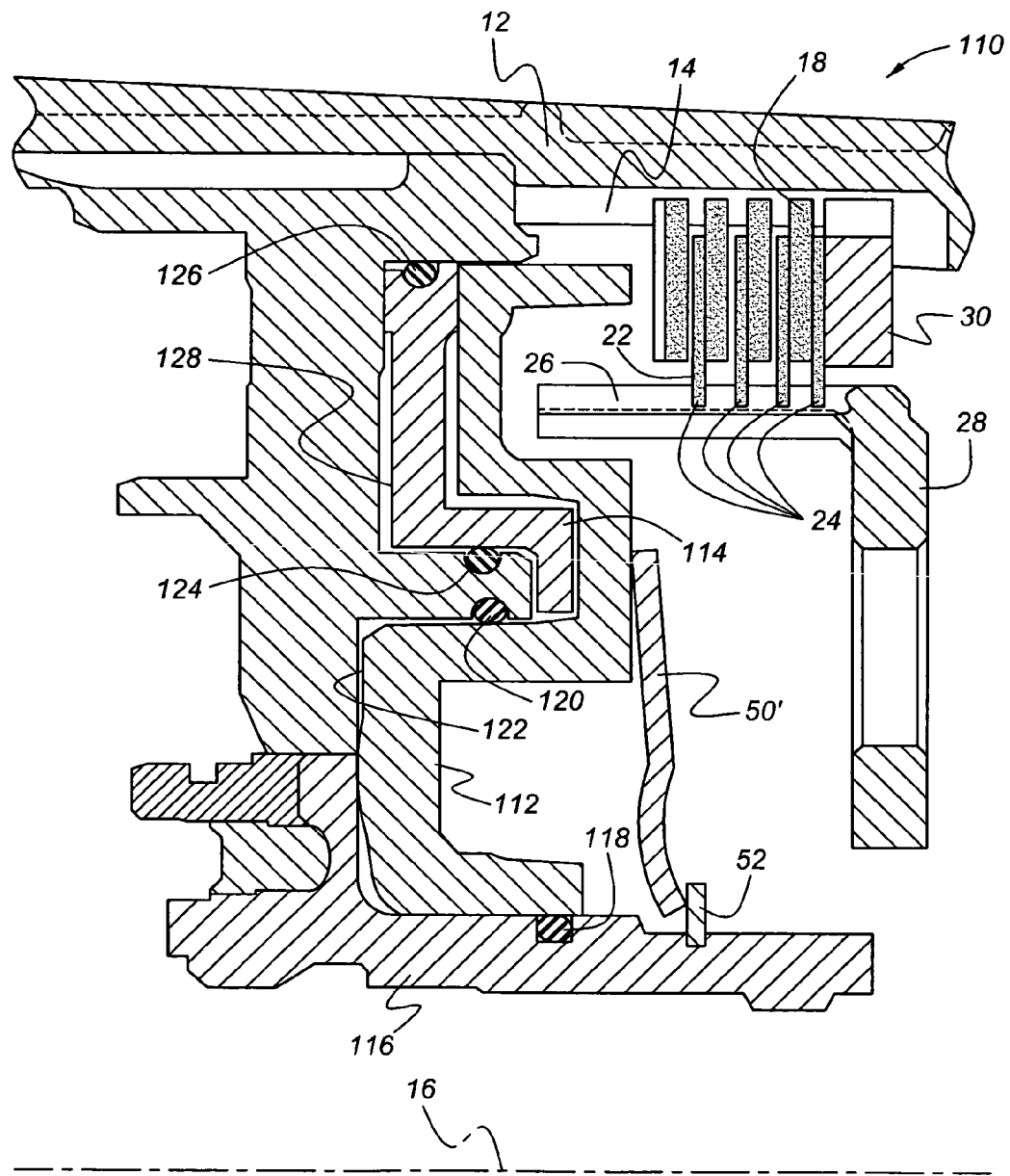
FIG. 4 is a cross section taken at a diametric plane through a friction clutch having nested pistons for actuating the clutch.

FIG. 4 is a cross section of a clutch 110 for use with a system according to this invention, the clutch including nested actuating pistons 112, 114, displaceable in a hydraulic cylinder 116, rather than a single piston. The first piston 112 is sealed at the cylinder surface by O-rings 118, 120, or another type of dynamic seal, against the passage of hydraulic fluid, the seals 118, 120 providing a boundary for a primary, dynamic pressure area 122 on the face of the piston 112 between the seals. The second piston 114 is sealed at the cylinder surface by O-rings 124, 126, against the passage of hydraulic fluid, the seals 124, 126 providing a boundary for a secondary, static pressure area 128 on the face of the piston 114 between those seals.

The pistons 112, 114 are actuated by hydraulic pressure supplied through lines (not shown) connected to the outputs of the system of FIG. 2, i.e., clutch areas D1 and D2. Piston 112 moves rightward to engage the clutch in response to hydraulic pressure applied to the clutch area 122 (D1). Before the clutch 110 is fully engaged, the clutch is first stroked by applying pressure to the primary area 122, thereby taking up clearances between clutch components, principally spaces between the clutch discs and pressure plates 20, 24. Preferably, the stroke displacement of the clutch is performed with close control so that it is completed without excess displacement or pressure. After the clutch is stroked, the clutch becomes fully engaged by applying pressure to the secondary piston area 46. The clutch must have torque capacity sufficient to produce and hold a force between the pressure plates 18 and discs 22 such that the clutch can transmit between the connecting members 12 and 14 the magnitude of torque required in the oncoming gear ratio.

A check ball 41, located behind the piston area 46, opens to admit air into the cylinder space adjacent the secondary, static piston area 46 when piston 34 is displaced by pressure applied to the primary, dynamic piston area 44 area. This opening through the check valve 41 prevents a vacuum from forming in that portion of the cylinder as the piston moves in response to DI pressure. The check valve seats and closes when hydraulic pressure is applied to piston area 46.

The piston is actuated for rightward displacement to engage the clutch when hydraulic pressure is applied to one or both of the spaces between the cylinder piston areas 44 and 46. Before fully engaging the clutch 110, the clutch is first stroked by applying regulated pressure to the primary area 122, the D1 area, thereby taking up clearances between clutch components, principally spaces between the clutch discs and pressure plates 18, 22. After the clutch 110 is stroked, the clutch becomes fully engaged by applying pressure to the secondary piston area 128, the D2 area. The force applied by hydraulic pressure to secondary piston 114 adds to the force applied to primary piston 112 because the pistons are in mutual contact at both extremities of their travel in the cylinder 116. Therefore when both pressure areas, both when the clutch is disengaged as shown in FIG. 4, and by the In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for actuating a clutch that alternately driveably connects and disconnects components, comprising:
   a clutch including a cylinder, a piston displaceable in the cylinder and including a first apply area and a second apply area;
   a fluid pressure source;
   a source of variable control pressure; and
   a control coupled with the fluid pressure source and operative in response to the control pressure to engagd the clutch initially by increasing pressure at the first apply area to a first magnitude followed by an increase in pressure at the first apply area and the second apply area above the first magnitude to a second magnitude, and to disengage the clutch in response to the control pressure initially by decreasing pressure at the second apply area the second magnitude, and decreasing pressure at the first apply area from the second magnitude followed by a decrease in pressure at the first apply area.

2. The system of claim 1 wherein the second apply area is larger than the first apply area.

3. The system of claim 1 wherein the control includes an orifice located between the fluid pressure source and the second apply area, the orifice being sized to produce a desired rate of fluid flow to the second apply area from the fluid pressure source.

4. The system of claim 1 further comprising:
   a seal located between the first apply area and the second apply area for sealing against passage of fluid therebetween.

5. A system of claim 1 including:
   a first passage communicating a first output of the control and the first apply area; and
   a second passage communicating a second output of the control and the second apply area.

6. A system for controlling actuation of a clutch that alternately driveably connects and disconnects components, comprising:
a clutch including a cylinder, a piston displaceable in the cylinder, a first apply area and a second apply area formed on the piston, which areas are pressurized to actuate the clutch;
a fluid pressure source;
a source of variable control pressure;
a regulator valve communicating with the fluid pressure source, responsive to the control pressure and a feedback pressure at the first apply area to regulate pressure at the first apply area up a first magnitude of control pressure;
a first latch valve responsive to the control pressure to open communication between the first apply area and said feedback to the regulator valve while control pressure is equal to or less than the first magnitude, and to close said communication when control pressure exceeds the first magnitude; and
a second latch valve responsive to the control pressure to close communication between the second apply area and the fluid pressure source when control pressure is equal to or less than a second magnitude, and to open said communication when control pressure exceeds the second magnitude.

7. The system of claim 6, further comprising:
an orifice located between the fluid pressure source and the second apply area, the orifice being sized to produce a desired rate of fluid flow to the second apply area from the fluid pressure source.

8. The system of claim 6, wherein the regulator valve further comprises:
a chamber including a first port communication with the fluid pressure source, a second port spaced from the first port and communicating with exhaust pressure, and a third port communicating with the first apply area;
a spool supported in the chamber for displacement, having a first land communicating with the control pressure, and a second land communicating with the feedback pressure, and various control lands spaced mutually along the spool;
a control spring producing a force applied to the second land and opposing spool displacement due to the control pressure; and wherein
the control lands open and close communication between the first port and the second port, and open at close communication between the second port and third port in response to the effect on the spool of the control spring, the control pressure and the feedback pressure.

9. The system of claim 8, wherein the first latch valve further comprises:
a second chamber including a fourth port communication with the first apply area, a fifth port communicating with second control land, and a sixth port communication with an exhaust pressure;
a second spool supported in the chamber for displacement including a third land communicating with the control pressure, and various control lands spaced mutually along the second spool;
a second control spring producing a force opposing spool displacement due to the control pressure; and
the control lands opening and closing communication between the fourth port and the fifth port, and opening and closing communication between the fifth port and sixth port in response to effect on die spool of the second control spring, and the control pressure.

10. The system of claim 6, wherein the second latch valve further comprises:
a third chamber including a seventh port communication with the second apply area, and an eighth port communicating with the fluid pressure source;
a third spool supported for displacement in the third chamber including a fourth land communicating with the control pressure, and a control land;
a third control spring producing a force opposing displacement of the third spool due to the control pressure; and
the control land opening and closing communication between the seventh port and the eighth port in response to the effect on the spool of the third control spring and the control pressure.

11. The system of claim 6 further comprising a device for opening and closing a volume of the cylinder that is bounded in part by the second apply area in response to a differential pressure across the device.

12. A system for controlling actuation of a clutch that alternately driveably connects and disconnects components, comprising:
a clutch including a piston, a first apply area and a second apply area formed on the piston, which areas are pressurized to actuate the clutch;
a fluid pressure source;
a source of variable control pressure;
a regulator valve including:
a chamber including a first port communication with the fluid pressure source,
a second port spaced from the first port and communicating with exhaust pressure, and a third port communicating with the first apply area;
a spool supported in the chamber for displacement, having a first land communicating with the control pressure, and a second land communicating with a feedback pressure, and various control lands spaced mutually along the spool;
a control spring producing a force applied to the second land and opposing spool displacement due to the control pressure; and the control lands open and close communication between the first port and the second port, and open and close communication between the second port and third port in response to the effect on the spool of the control spring, the control pressure and the feedback pressure;
a first latch valve including:
a second chamber including a fourth port communication with the first apply area, a fifth port communicating with second control land, and a sixth port communicating with an exhaust pressure;
a second spool supported in the chamber for displacement including a third land communicating with the control pressure, and various control lands spaced mutually along the second spool;
a second control spring producing a force opposing spool displacement due to the control pressure; and
the control lands open and close communication between the fourth port and the fifth port, and open and close communication between the fifth port and sixth port in response to the effect on the spool of the second control spring, and the control pressure; and a second latch valve including:
- a third chamber including a seventh port communication with the second apply area, and an eighth port communicating with the fluid pressure source;
- a third spool supported for displacement in the third chamber including a fourth land communicating with the control pressure, and a control land; and
- a third control spring producing a force opposing displacement of the third spool due to the control pressure; and the control land open and close communication between the seventh port and the eighth port in response to the effect on the spool of the third control spring and the control pressure.

13. A method for controlling actuation of a clutch that includes a piston, a first apply area and a second apply area formed on the piston and pressurized to actuate the clutch, comprising the steps of:
- providing a fluid pressure source;
- providing a source of variable control pressure;
- using control pressure and feedback pressure from the first apply area to regulate pressure at the first apply area up to a first magnitude of control pressure;
- opening a connection between the fluid pressure source and the first apply area when control pressure exceeds the first magnitude; and
- using control pressure to close communication between the second apply area and the fluid pressure source when control pressure is equal to or less than a second magnitude.

14. The method of claim 13 further comprising the step of:
using control pressure to open communication between the second apply area and the fluid pressure source when control pressure exceeds the second magnitude.

15. A system for actuating a clutch that alternately driveably connects and disconnects components, comprising:
- a clutch including a cylinder, a first piston displaceable in the cylinder and including a first apply area, and a second piston displaceable in the cylinder including a second apply area;
- a fluid pressure source;
- a source of variable control pressure; and
- a control coupled the fluid pressure source and operative in response to the control pressure to engage the clutch initially by increasing pressure at the first apply area to a first magnitude followed by an increase in pressure at the first apply area and the second apply area above the first magnitude to a second magnitude, and to disengage the clutch in response to the control pressure initially by decreasing pressure at the second apply area from the second magnitude, and decreasing pressure at the first apply area from the second magnitude followed by a steady decrease in pressure at the first apply area.

16. The system of claim 15 wherein the control includes an orifice located between the fluid pressure source and the second apply area, the orifice being sized to produce a desired rate of fluid flow to the second apply area from the fluid pressure source.

17. The system of claim 15 further comprising:
first seals for sealing the first apply area and the cylinder against passage of fluid therebetween; and
second seals for sealing the second apply area and the cylinder against passage of fluid therebetween.

* * * * *